Oct. 31, 1933.  E. R. SMITH ET AL  1,933,226

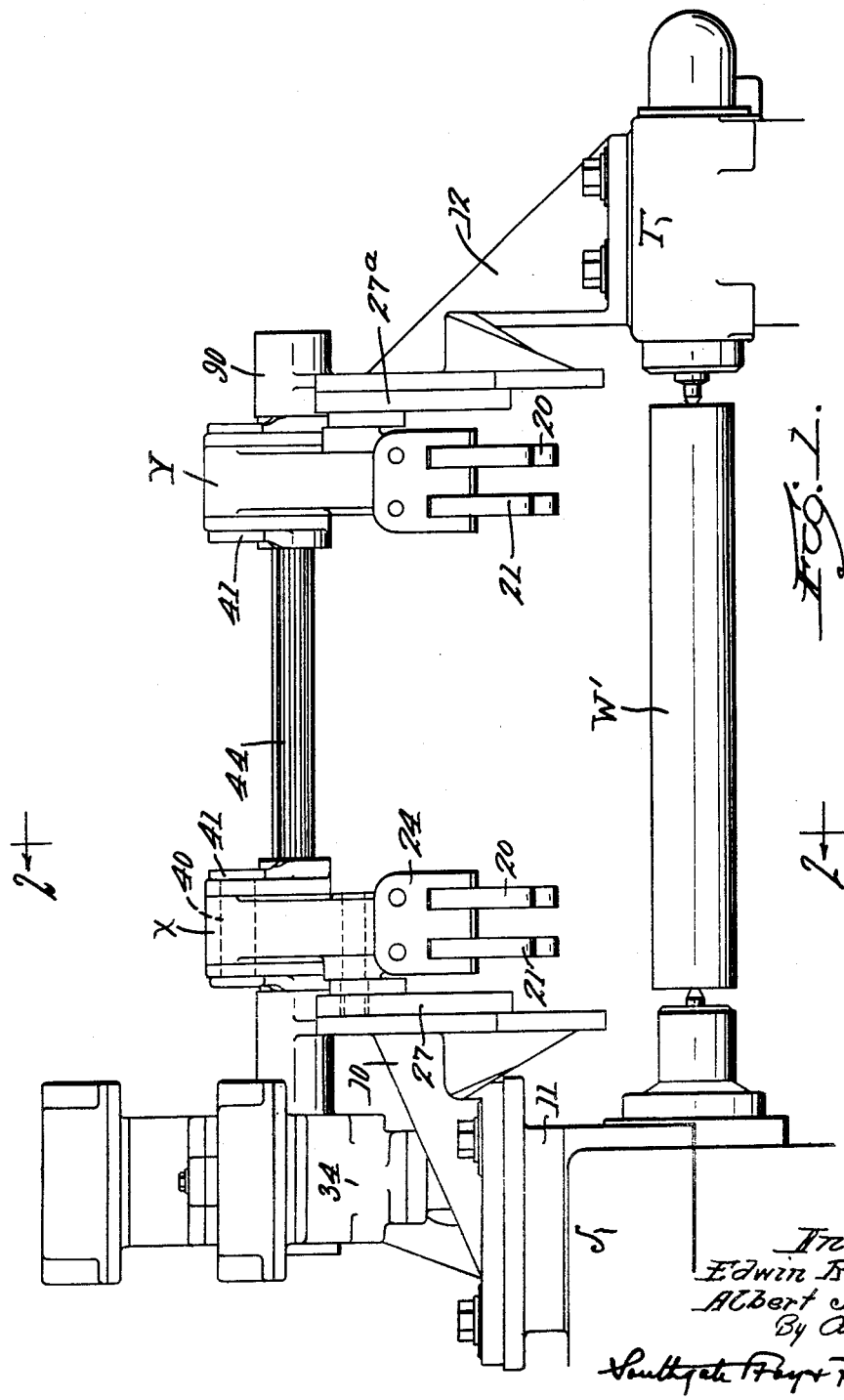

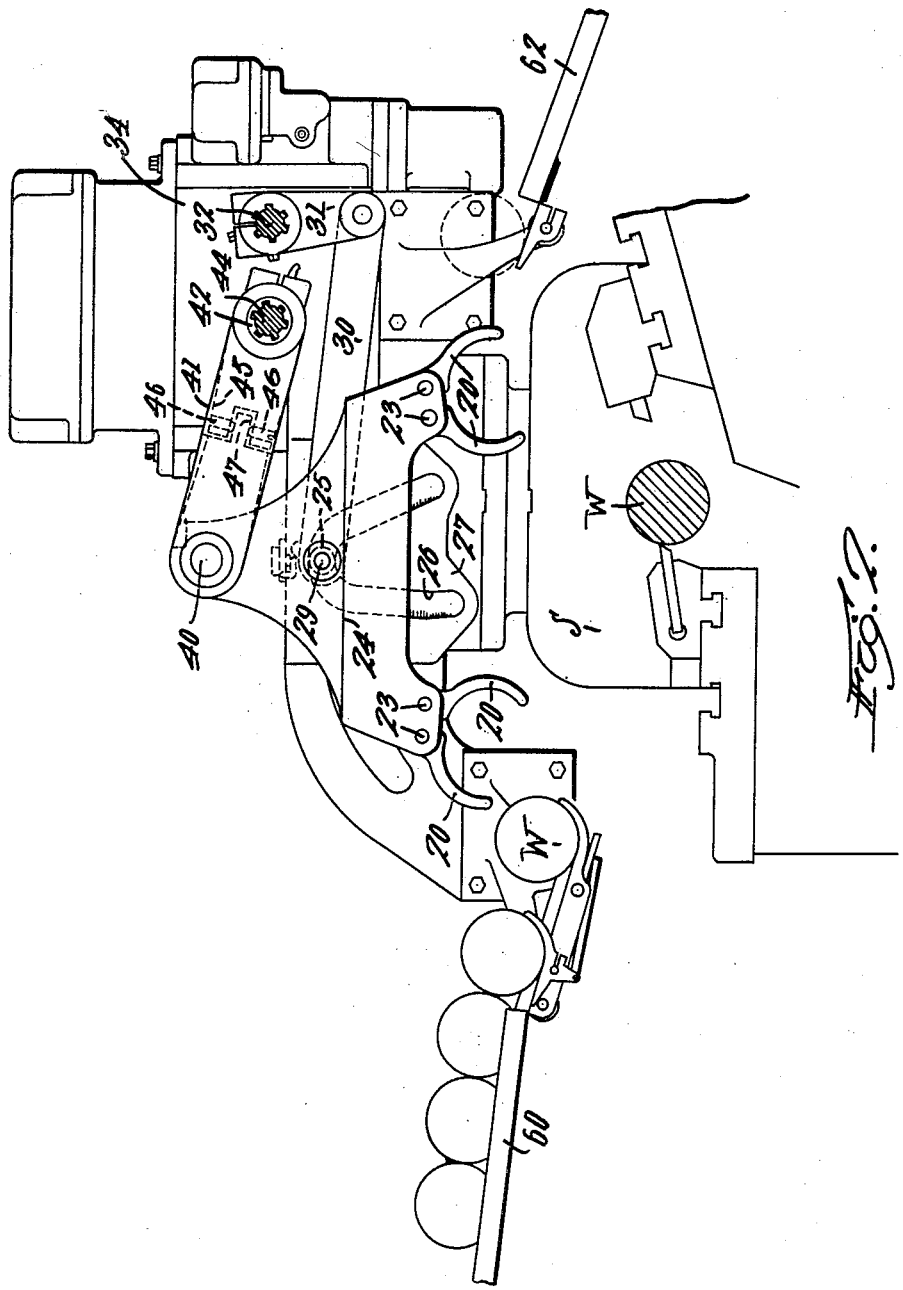

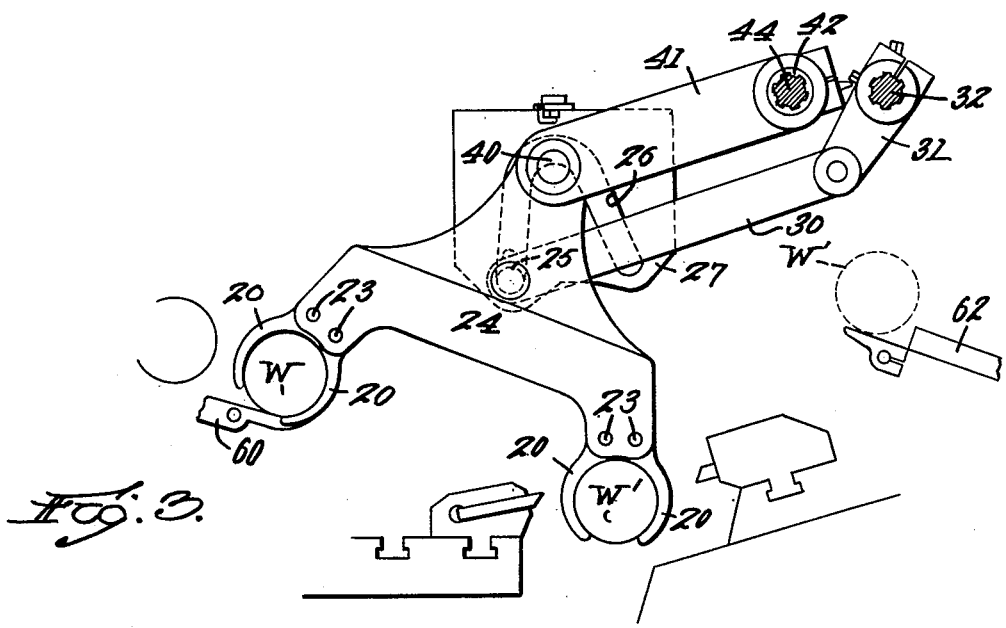
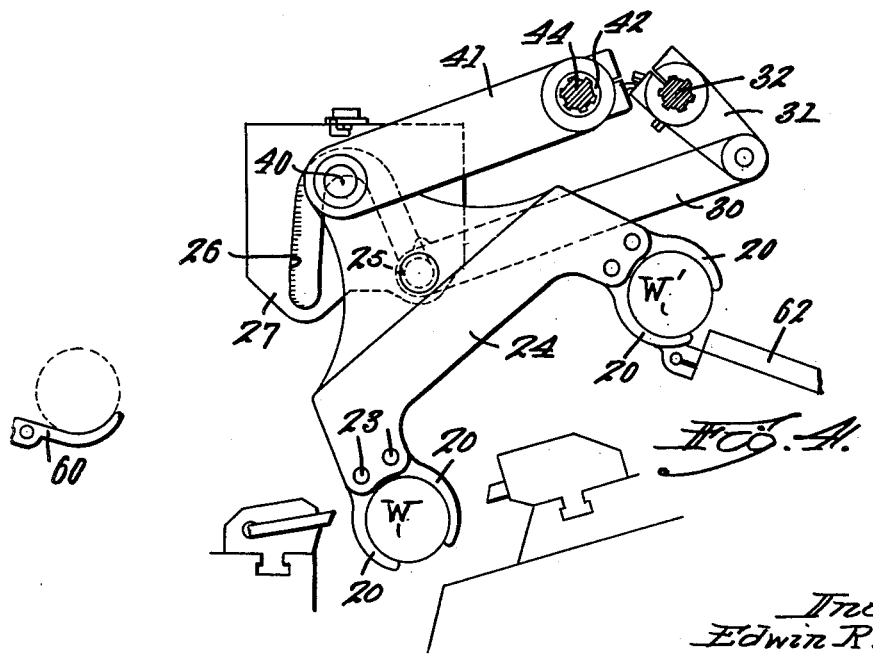

WORK HANDLING MECHANISM

Filed March 3, 1932  7 Sheets-Sheet 6

Inventors
Edwin R. Smith
Albert Schinkai
By Attorneys
Southgate Ray & Hawley

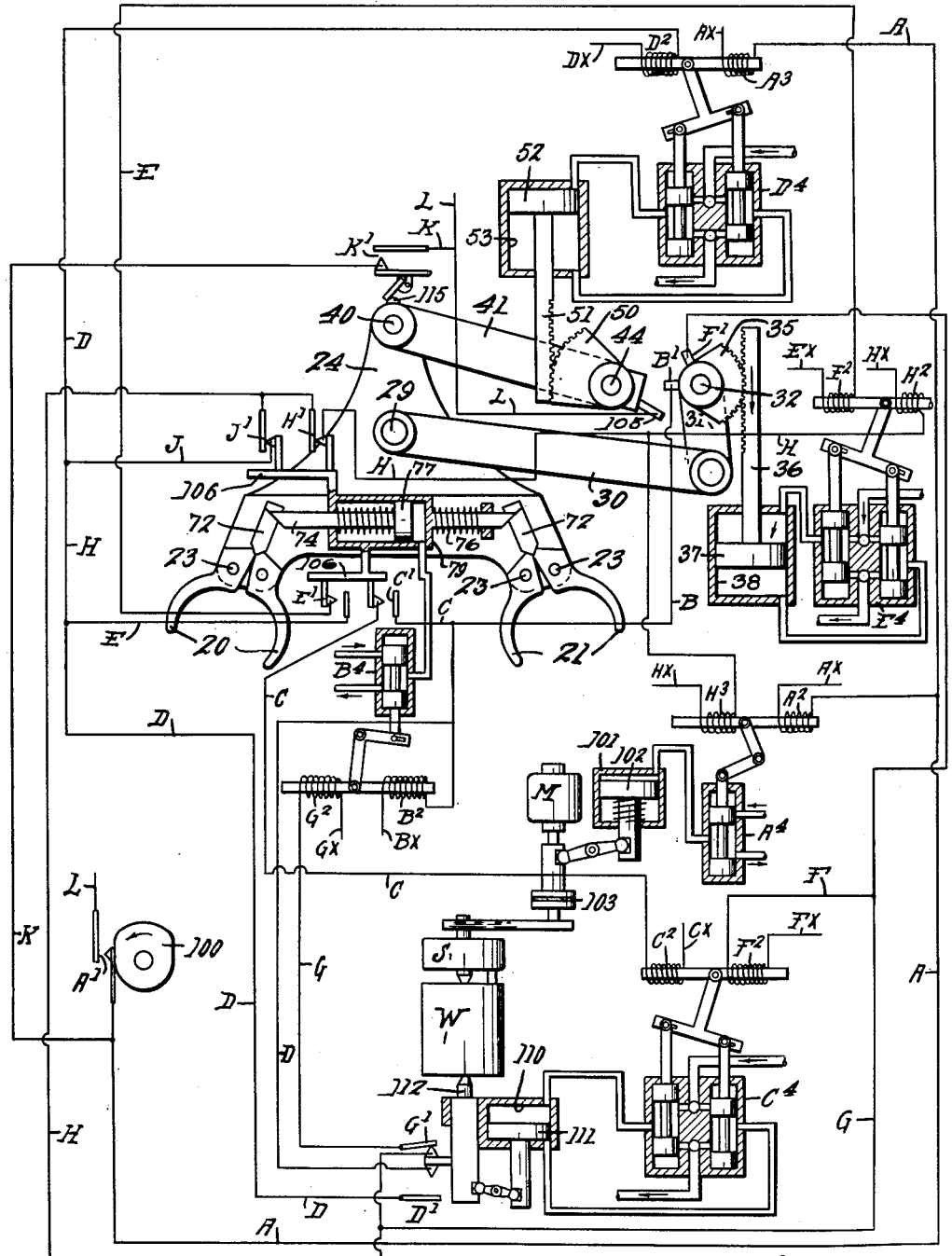

Patented Oct. 31, 1933

1,933,226

UNITED STATES PATENT OFFICE 1,933,226

WORK-HANDLING MECHANISM

Edwin R. Smith and Albert Schinkez, Seneca Falls, N. Y., assignors to Seneca Falls Machine Company, Seneca Falls, N. Y., a corporation of Massachusetts Application March 3, 1932. Serial No. 596,546

13 Claims. (Cl. 82—2)

This invention relates to mechanism by which duplicate pieces of work may be automatically fed to a machine tool or other apparatus and may be thereafter removed therefrom. Mechanism for such purposes has been previously devised by us, on which United States Patents No. 1,794,424 and No. 1,841,988 have been issued.

It is the general object of our present invention to improve the mechanism shown in our prior patents in certain important respects, to the intent that the mechanism may be more easily adapted to different machine tools or apparatus and may be more conveniently and effectively controlled in its successive movements.

Important features of the invention relate to the provision of improved means for actuating the work-engaging members, to means for more effectively handling long pieces of work, to the provision of more compact and self-contained control devices, and to the provision of an improved combination of hydraulical actuating mechanism with electrical control devices.

Our invention further relates to certain arrangements and combinations of parts which will be hereinafter described and more particularly pointed out in the appended claims.

A preferred form of the invention is shown in the drawings, in which

Fig. 1 is a side elevation of our improved work-handling mechanism;

Fig. 2 is a sectional end elevation, taken along the line 2—2 in Fig. 1;

Figs. 3 and 4 are views similar to Fig. 2 but showing the parts in different successive positions;

Fig. 10 is a diagrammatic view showing the general relation of the machine parts and work-handling mechanism with the hydraulic actuating mechanism and the electrical control circuits.

Referring particularly to Figs. 1 and 2, our improved work-handling mechanism is shown as mounted on the headstock S and tail-stock T of a lathe or grinder or other similar machine tool.

In Fig. 1 we have shown two work-engaging or gripper mechanisms X and Y, spaced apart to engage the end portions of a relatively long piece of work W'. The mechanism X is mounted on a bracket 10 supported on an adaptor plate 11, secured to the head-stock S. The work-engaging mechanism Y is similarly supported on a bracket 12, carried by the tail-stock T.

While we have shown two gripper mechanisms X and Y for handling long pieces of work, it will be understood that our invention is not limited to the use of two gripper mechanisms, but that the single mechanism X may be used for handling shorter work.

Figure 6:
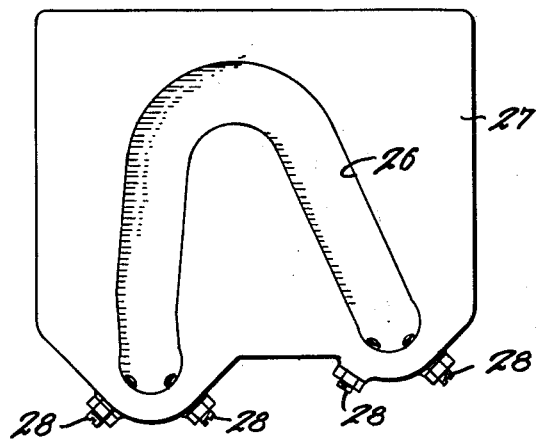
Fig. 6 is a front elevation of a fixed cam plate to be described.

We will first describe the gripper mechanism X, of which the gripper mechanism Y is substantially a duplicate. The work-engaging members or grippers 20 and 21 (Fig. 2) are mounted on pivot studs 23 in a gripper supporting member 24. The member 24 is provided with a cam roll 25 positioned in a cam groove 26 formed in the face of a fixed cam plate 27 (Fig. 6). Screws 28 are threaded in the lower portions of the plate 27 and are adapted to form adjustable stops which determine the lowermost positions of the cam roll 25.

Figure 5:
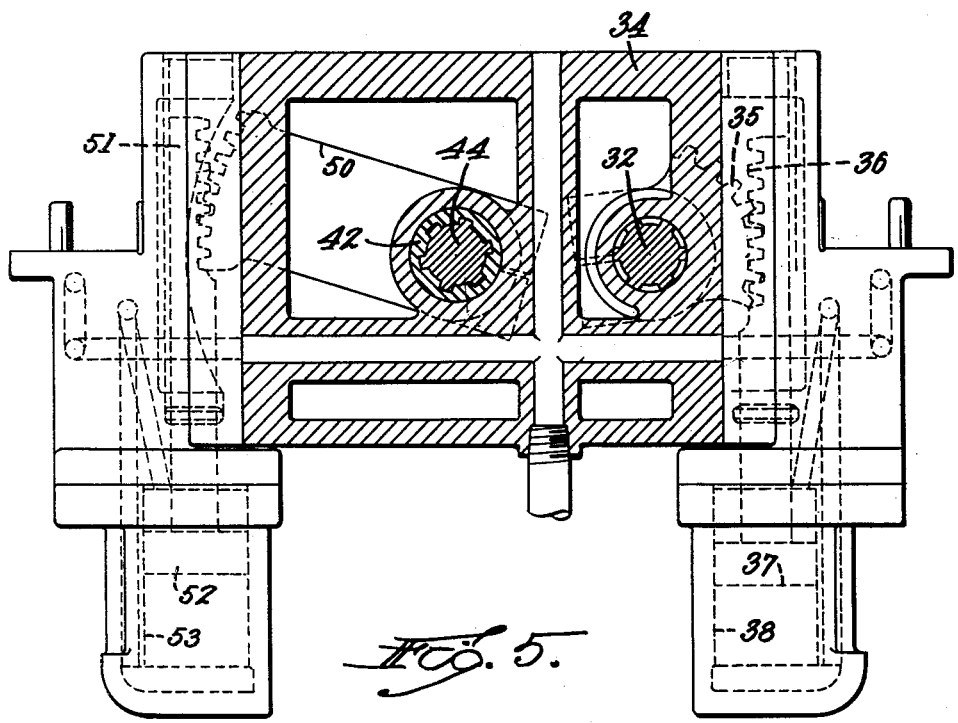
Fig. 5 is a sectional end elevation of certain actuating mechanism.

The roll 25 (Fig. 2) is mounted on a stud 29, fixed in the member 24 and connected by a link 30 to an arm 31 secured to a splined actuating shaft 32. The shaft 32 extends into a fixed casing or frame member 34 (Fig. 5) and is provided with a segment gear 35 engaging rack teeth on the side of a plunger 36.

The plunger 36 is actuated by a piston 37 slidable in a cylinder 38 in the casing 34. Suitable provision is made for admitting oil or other fluid under pressure to one end or the other of the cylinder 38, thereby actuating the piston 37 and link 30.

The gripper supporting member 24 is also provided with a stud 40 (Fig. 2) to which a gripper-lifting arm 41 is pivoted. The arm 41 is loosely mounted on a sleeve 42 on a second splined shaft 44. An intermediate arm 45 is splined to the shaft 44 and is provided with set screws 46 (Fig. 2) adjustable to engage the opposite sides of a lug or projection 47 on the lifter arm 41. The exact angular relation of the lifter arm 41 to the splined shaft 44 may thus be conveniently adjusted.

The shaft 44 is provided with a segment gear 50 (Fig. 5) engaging rack teeth on a plunger 51 which is connected to a piston 52, slidable in a cylinder 53 in the casing or frame member 34 previously described. The splined shaft 44 and lifter arm 41 are used for raising and lowering the pivot stud 40 and the gripper supporting member 24, while the splined shaft 32, arm 31 and link 30 are used for swinging the member 24 to the right or left as said member is raised and lowered, thereby enabling the cam roll 25 to follow the cam groove 26.

By suitably controlling the admission of pressure fluid to the cylinders 38 and 53, the shifting movements of the grippers and gripper supporting member may be controlled, and the parts may be moved from the neutral position shown in Fig. 2 to the leading position shown in Fig. 3, and to the discharge position shown in Fig. 4.

By such movements, a piece of work W may be removed from a loading runway 60 and may be placed in working position between the head and tail centers of the machine tool, while at the same time a finished piece of work W' is removed from the machine tool and is transferred to the discharge runway 62.

Suitable devices may be provided on the runway 60 for releasing a piece of work W on the leading runway 60, and for receiving a finished piece of work W' on the discharge runway 62. These devices, however, form no part of our present invention, and need not be described in detail herein.

Figure 7:
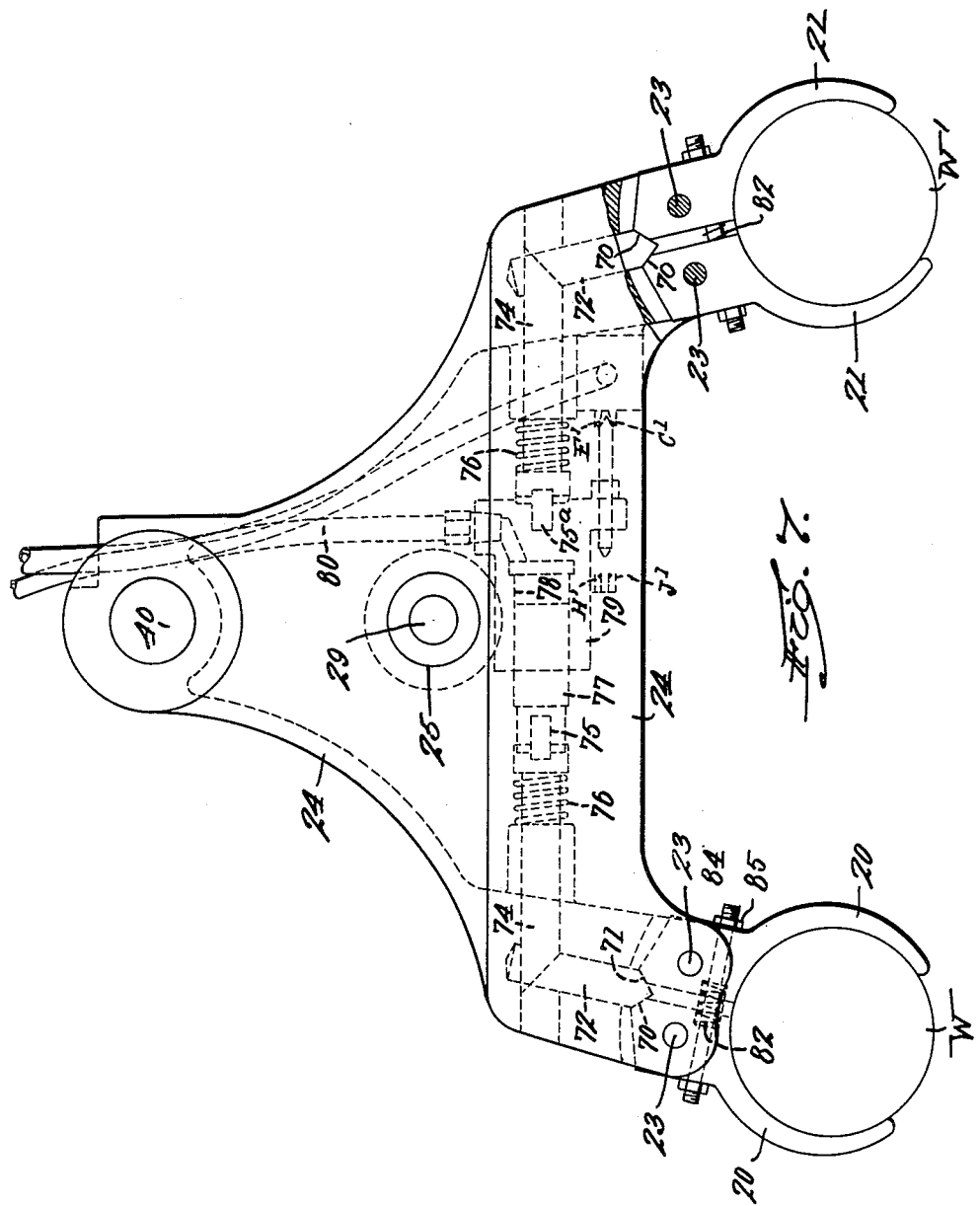
Fig. 7 is an enlarged front elevation of a pair of grippers and the supporting member on which they are mounted.

We have provided special actuating mechanism for the grippers 20 and 21, which mechanism is shown in detail in Fig. 7. The grippers 20 and 21 are mounted in pairs on pivot studs 23 in the supporting member 24, as previously described.

Upwardly extending portions of the grippers 20 and 21 are provided with adjacent cam faces 70, engaged by opposed wedge-like surfaces 71 on the lower ends of plungers 72, slidably mounted in passages in the supporting member 24. The upper ends of the plungers 72 are bevelled for engagement by correspondingly bevelled ends of additional plungers 74, also slidable in bearings in the member 24, but angularly disposed with respect to the plungers 72.

Two pair of grippers 20 and 21 are preferably provided in each gripper head X or Y, as indicated in Fig. 1, and separate actuating plungers 72 and 74 (Fig. 7) are provided for each pair of gripper members 20 or 21. The two plungers 74 for the grippers 20 engage opposite ends of an equalizer bar 75 and the two plungers 74 for the grippers 21 similarly engage a second equalizer bar 75$^a$. Springs 76 on the plungers 74 act to yieldingly withdraw the plungers 74 when pressure thereon is relieved.

One equalizer bar 75 is engaged by a piston 77, slidable in a cylinder 78 in a casing 79 by which the other equalizer bar 75$^a$ is engaged. Fluid under pressure may be supplied to the cylinder 78 through a pipe connection 80.

When pressure fluid is thus delivered to the cylinder 78, the piston 77 and casing 79 are forced apart and thereby act through the equalizer bars 75 and 75$^a$, plungers 74, and plungers 72 to close the grippers 20 and 21 on a piece of work W or W'.

When pressure in the cylinder 78 is relieved, the springs 76 withdraw the plungers 74, and the gripper members 20 are opened by additional springs 82, positioned in pockets on the inner adjacent faces of the grippers. Inward movement of the grippers may be limited by the engagement of the inner ends of stop screws 84, threaded in the grippers and secured by lock nuts 85.

The gripper mechanism Y is in all respects similar to the gripper mechanism X previously described, but a separate cam plate 27$^a$ is provided on the bracket 12 for controlling the movements of the gripper mechanism Y. The splined shafts 32 and 44 extend continuously through both gripper mechanisms, and outer bearings 90 (Fig. 1) are provided on the brackets 12 for the splined shafts 32 and 44.

*Control mechanism and operation*

Figure 8:
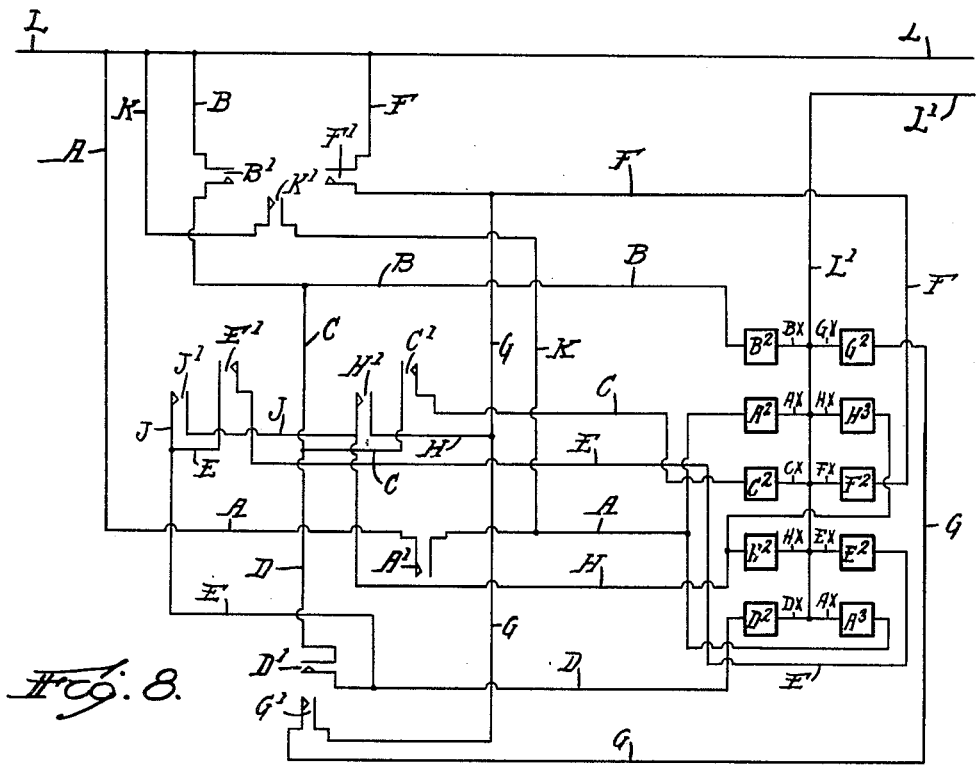
Fig. 8 is a diagrammatic view of the electrical control circuits.
Figure 9:
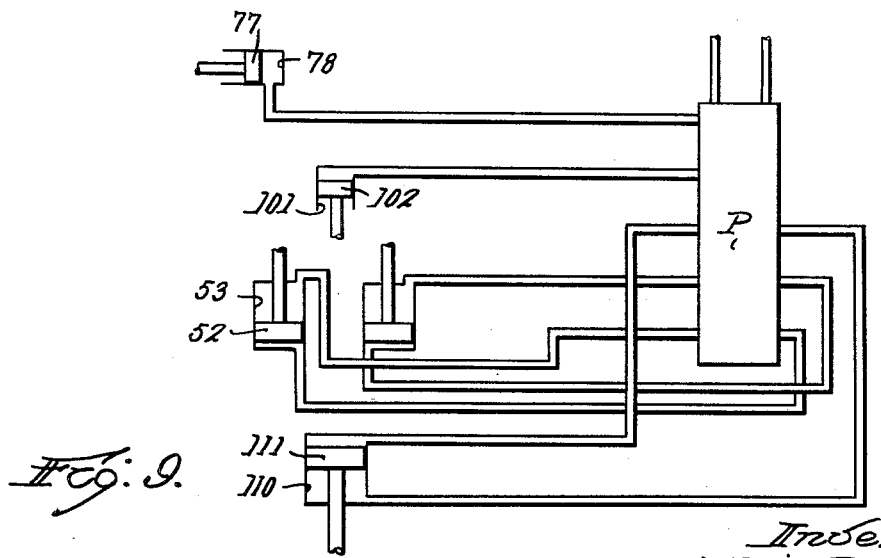
Fig. 9 is a diagrammatic view of the hydraulic actuating mechanism.

Our improved machine is so arranged that it will operate entirely automatically and will remove a finished piece of work and insert a new blank after each machine operation is completed. For the purpose of automatic control, we have provided certain electrical control circuits shown diagrammatically in Fig. 8 by which the hydraulic actuating mechanism shown diagrammatically in Fig. 9 is controlled.

In Fig. 10 we have shown the circuits and hydraulic mechanism, together with diagrammatic views of the machine parts and the work-handling mechanism, from which the coordination of the various parts may be readily seen.

We will now describe the automatic control and operation of our improved mechanism.

Electric current is taken from line wires L and L' (Fig. 8), supplied from any suitable source of power, and branch circuits designated by the letters A to K respectively are arranged to effect the various desired control combinations.

The branch circuit A contains the switch A' and the solenoid coils A$^2$ and A$^3$ by which valve mechanisms A$^4$ and D$^4$ (Fig. 10) are actuated in one direction. The switch A' is arranged to be closed by a cam 100 (Fig. 10) which makes one revolution for each cycle of operation of the machine tool and which maintains the switch A' closed for a limited period only.

When this switch is closed, the solenoid A$^2$ (Fig. 10) is energized, shifting the valve mechanism A$^4$ to connect an inlet or pressure pipe from a pressure tank P (Fig. 9) to a cylinder 101 (Fig. 10) having a piston 102 arranged to open or disconnect a clutch 103 when pressure is applied in the cylinder 101. Consequently when the circuit A is closed, the work W is disconnected from its driving motor M and immediately comes to rest.

At the same time, the solenoid A$^3$ shifts the valve mechanism D$^4$ to connect an inlet or pressure pipe to the upper end of the cylinder 53, thus depressing the piston 52 and arm 41, and moving the work-handling mechanism from the neutral position shown in Fig. 2 to the loading position shown in Fig. 3.

This movement of the arm 41 causes a projection 105 to close a switch B' mounted on the link-actuating arm 31. The closing of the switch B' energizes the solenoid B$^2$ which actuates the valve mechanism B$^4$ to admit pressure to the cylinder 78 by which the grippers 20 and 21 are closed on the work.

During this closing operation, a member 106 (Figs. 7 and 10) is moved to close switches C' and E'. The C circuit feeds through the switch B' which is still closed and the closing of the switch C' energizes the solenoid C$^2$ which actuates valve mechanism C$^4$ (Fig. 10) to admit pressure to the lower end of a cylinder 110, thus moving a piston 111 to withdraw the tail center 112 in the tail stock T. The closing of the switch E' produces no effect at this time, as the E circuit branches off of the D circuit and is still open at the switch D'.

As the tail center is withdrawn, however, the switch D' (Fig. 10) in the D circuit is closed, thus energizing the solenoid D² and also completing the closing of the E circuit through the solenoid E². Before the switch D' is closed, however, the cam 100 has allowed the switch A' to open, so that no current is then flowing through the solenoids A² and A³.

The solenoid D² reverses the valve mechanism D⁴ previously actuated by the solenoid A³ and admits pressure to the lower end of the cylinder 53, thus raising the arm 41 and the gripper-supporting member 24. At the same time the solenoid E² shifts the valve mechanism E⁴ to admit pressure to the lower end of the cylinder 38, thus shifting the arm 31, link 30 and supporting member 24 to the right in Fig. 10. As this combined movement begins, the lug 105 moves away from the switch B' and the switch opens, de-energizing the solenoids B², C², D² and E².

As the member 24 reaches its highest position, a lug 115 (Fig. 10) on the member 24 engages and closes a switch K' which connects into the A circuit beyond the switch A' which has been previously opened. Consequently the solenoids A² and A³ are again energized.

The solenoid A² produces no new effect, as the valve mechanism A⁴ has remained in the position to which it was previously moved by the solenoid A², but the solenoid A³ again reverses the valve mechanism D⁴, admitting pressure to the upper end of the cylinder 53 and depressing the arm 41 and supporting member 24, thus moving the parts to the delivery position indicated in Fig. 4.

As this movement is being completed, the lug 105 engages and closes the switch F' in the F circuit, energizing the solenoid F² by which the valve mechanism C⁴ is reversed, admitting pressure to the upper end of the cylinder 110 and advancing the tail center 112 to engage a new piece of work W.

This advance movement of the tail center opens the switch D' and closes the switch G' in the G circuit, energizing the solenoid G² and releasing the pressure in the cylinder 78, thus allowing the grippers 20 and 21 to open.

This contracting movement of the gripper piston 77 and cylinder 78 causes the member 106 to allow the switches C' and E' to open, and causes the same or a corresponding member 106 to close the switches H' and J'.

The closing of the switch H' energizes the solenoid coils H² and H³. The coil H² reverses the valve mechanism E⁴, admitting pressure to the upper end of the cylinder 38 and tending to swing the arm 31, link 30 and supports 24 to the left. At the same time the coil H³ shifts the valve mechanism A⁴ to connect the cylinder 101 to the exhaust, thus allowing the spring-actuated piston 102 to re-engage the clutch 103 and cause the work to revolve.

The simultaneous closing of the switch J' closes a circuit around the now open switch D' and thus again energizes the solenoid coil D², shifting the valve mechanism D⁴ to admit pressure to the lower end of the cylinder 53, raising the arm 41 and support 24.

This brings the parts back to their original or neutral position, with the tail center engaging and supporting the work and with the clutch engaged to rotate the work, while the loading mechanism is in neutral raised position, with the grippers open. The parts remain in this position until the work is completed and the cam 100 again engages and closes the switch A'.

We have thus provided an entirely automatic combination of hydraulic actuating mechanism and electrical control devices by which the work is stopped, the tail center is withdrawn, the finished work is removed and discharged, a new piece of work is inserted, the tail center is advanced, and the work is again placed in rotation. The lug 105 is so actuated that it does not engage and close the switch B' as the loading mechanism returns to neutral position.

Where two gripper mechanisms as X and Y are used, a set of switches as described may be placed on each gripper mechanism, with each pair of similar switches in series, so that no operation of the mechanism can take place until the preceding operation has been completed by both gripper mechanisms.

While we have shown and described our invention in connection with work rotated on centers, the invention in many aspects is capable of more general application and may be used on machine tools or other apparatus in which the work is held stationary or has other than rotary movement or in which centers are not used. In such cases, the control of the work-rotating means may be omitted and the actuation of other means for securing the work may be substituted for the tail center movement.

Having thus described our invention and the advantages thereof, we do not wish to be limited to the details herein disclosed, otherwise than as set forth in the claims, but what we claim is:—

1. In a machine tool, work feeding mechanism comprising two sets of work-engaging devices spaced axially of the machine to handle long work, each set of said devices comprising two independently movable actuating elements, fluid-operated means for independently moving each actuating element for one set of said devices, and positive mechanical connections between each actuating element in one set of work-engaging devices and the corresponding actuating element in the other set of work-engaging devices whereby the movement of both actuating elements of both sets of devices are positively coordinated, said second set of devices being adjustable lengthwise of the work.

2. In a machine tool, work feeding mechanism comprising two sets of work-engaging devices spaced axially of the machine to handle long work, each set of said devices comprising two independently movable actuating elements, fluid-operated means for independently moving each actuating element for one set of said devices, and a pair of splined shafts each connecting an actuating element of one set of work-engaging devices with the corresponding actuating element of the second set of work-engaging devices, whereby the actuating elements of said second set are operated and whereby the movements of both actuating elements of both sets of work-engaging devices are positively coordinated, said second set of devices being axially adjustable along said splined shafts.

3. In a machine tool, two spaced sets of work-engaging devices for handling long work, fluid-operated means for actuating one set of said devices, a positive mechanical connection effective to actuate the second set of work-engaging devices and to coordinate the movements of said two sets of devices, and a separate fluid-operated means for opening and closing each set of said work-engaging devices.

4. In a machine tool, two spaced sets of work-engaging devices for handling long work, fluid-operated means for actuating one set of said devices, a positive mechanical connection effective to actuate the second set of work-engaging devices and to coordinate the movements of said two sets of devices, a separate fluid-operated means for opening and closing each set of said work-engaging devices, and means to prevent further operation of the work-handling mechanism if either set of work-engaging devices fails to complete its indicated opening or closing movement.

5. In a machine tool, two spaced sets of work-engaging devices for handling long work, fluid-operated means for actuating one set of said devices, a positive mechanical connection effective to actuate the second set of work-engaging devices and to coordinate the movements of said two sets of devices, a separate fluid-operated means for opening and closing each set of said work-engaging devices, and electrical control devices effective to cause further operation of the work-handling mechanism only after both sets of work-engaging devices complete their indicated opening or closing movements.

6. In a machine tool, a work-supporting member, a fixed plate having an inverted U-shaped cam groove, a cam roll on said supporting member positioned in said groove, means to raise and lower said supporting member, means to swing said member transversely, and separate fluid-operated actuating mechanism for each moving means.

7. In a machine tool, a work-supporting member, a fixed plate having an inverted U-shaped cam groove, a cam roll on said supporting member positioned in said groove, means to raise and lower said supporting member, means to swing said member transversely, a separate fluid-operated actuating mechanism for each moving means, and control devices determining the successive operations of said actuating mechanisms.

8. In a machine tool, a work-supporting member, a fixed plate having an inverted U-shaped cam groove, a cam roll on said supporting member positioned in said groove, means to raise and lower said supporting member, means to swing said member transversely, a separate fluid-operated actuating mechanism for each moving means, and control devices effecting reverse movements of said first means during simultaneous movements of said second means in one direction only.

9. In a machine tool, a work-supporting member, a fixed plate having an inverted U-shaped cam groove, a cam roll on said supporting member positioned in said groove, a rock arm pivoted to said supporting member and effective to raise and lower said member, a second rock arm, a link connecting said second rock arm to said supporting member, said second rock arm being effective to swing said member transversely, and means to effect actuation of said two rock arms in predetermined relation, during which actuation said cam roll is caused to traverse said cam groove.

10. In a machine tool, a work-supporting member, a fixed plate having an inverted U-shaped cam groove, a cam roll on said supporting member positioned in said groove, a rock arm pivoted to said supporting member and effective to raise and lower said member, a second rock arm, a link connecting said second rock arm to said supporting member, said second rock arm being effective to swing said member transversely, and separate actuating means for each rock arm, each actuating means being adapted to dwell during the operation of the other means.

11. In a machine tool, a work-supporting member, a fixed plate having an inverted U-shaped cam groove, a cam roll on said supporting member positioned in said groove, a rock arm pivoted to said supporting member and effective to raise and lower said member, a second rock arm, a link connecting said second rock arm to said supporting member, said second rock arm being effective to swing said member transversely, separate actuating means for each rock arm, and means to coordinate the movements of said arms.

12. In a work-handling mechanism for a machine tool, a supporting member, two sets of work-engaging devices mounted thereon, a single fluid-operated cylinder and piston mounted on said supporting member, and mechanical connections from said cylinder to one set of work-engaging devices and from said piston to the other set of work-engaging devices.

13. In a work-handling mechanism for a machine tool, a supporting member, two sets of work-engaging devices mounted thereon, a single fluid-operated cylinder and piston, mounted on said supporting member, and mechanical connections from said cylinder to one set of work-engaging devices and from said piston to the other set of work-engaging devices, said cylinder and piston being simultaneously moved in opposite directions relative to said supporting member to actuate said work-engaging devices.

EDWIN R. SMITH.
ALBERT SCHINKEZ.